(12) United States Patent
Outreman

(10) Patent No.: US 9,011,756 B2
(45) Date of Patent: Apr. 21, 2015

(54) THIN-WALLED PLASTIC CONTAINER FOR PRESSURIZATION

(75) Inventor: Jean-Tristan Outreman, St Maximin la Ste Baume (FR)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 13/184,062

(22) Filed: Jul. 15, 2011

(65) Prior Publication Data

US 2011/0266186 A1    Nov. 3, 2011

Related U.S. Application Data

(63) Continuation of application No. 12/681,931, filed as application No. PCT/FR2008/051826 on Oct. 9, 2008, now Pat. No. 8,043,552.

(30) Foreign Application Priority Data

Oct. 10, 2007    (FR) ...................................... 07 58185

(51) Int. Cl.
*B65D 85/00* (2006.01)
*B29C 49/64* (2006.01)
*B65B 3/02* (2006.01)
*B29K 67/00* (2006.01)

(52) U.S. Cl.
CPC ............. *B29C 49/64* (2013.01); *B29K 2067/00* (2013.01); *B65B 3/022* (2013.01)

(58) Field of Classification Search
None
See application file for complete search history.

(56) References Cited

U.S. PATENT DOCUMENTS

| 4,040,233 | A | 8/1977 | Valyi |
| 4,318,882 | A | 3/1982 | Agrawal et al. |
| 4,356,681 | A | 11/1982 | Barnes |
| 4,863,046 | A | 9/1989 | Collette et al. |
| 5,090,180 | A | 2/1992 | Sorensen |
| 5,281,387 | A | 1/1994 | Collette et al. |
| 5,419,866 | A | 5/1995 | Valyi |
| 5,540,879 | A | 7/1996 | Orimoto et al. |
| 5,614,148 | A * | 3/1997 | Beck et al. ..................... 264/532 |
| 5,637,167 | A * | 6/1997 | Krishnakumar et al. ....... 156/85 |
| 5,673,808 | A | 10/1997 | Valyi et al. |
| 5,735,420 | A | 4/1998 | Nakamaki et al. |
| 5,884,792 | A | 3/1999 | Krishnakumar et al. |
| 6,062,408 | A | 5/2000 | Beck et al. |
| 6,502,369 | B1 * | 1/2003 | Andison et al. .................. 53/432 |
| 6,568,156 | B2 | 5/2003 | Silvers et al. |
| 2002/0004090 | A1 | 1/2002 | LaFleur |
| 2002/0020149 | A1 | 2/2002 | Silvers et al. |
| 2003/0110736 | A1 | 6/2003 | Boyd |
| 2004/0131735 | A1 | 7/2004 | Korengel et al. |
| 2005/0121408 | A1 | 6/2005 | Deemer et al. |
| 2006/0261027 | A1 | 11/2006 | Denis et al. |
| 2007/0090083 | A1 | 4/2007 | Trude |
| 2010/0018166 | A1 | 1/2010 | Outreman |

FOREIGN PATENT DOCUMENTS

| DE | 19520925 A1 | 12/1996 |
| EP | 1468930 A1 | 10/2004 |
| EP | 1527999 A1 | 5/2005 |
| EP | 1974891 A1 | 10/2008 |
| JP | 01157828 A | 6/1989 |
| JP | 0994872 A | 4/1997 |
| JP | 2000313427 A | 11/2000 |
| JP | 2004160670 A | 6/2004 |
| WO | 03033361 A2 | 4/2003 |
| WO | 2004092029 A1 | 10/2004 |
| WO | 2006005615 A1 | 1/2006 |
| WO | 2006039523 A1 | 4/2006 |

OTHER PUBLICATIONS

Office Européen Des Brevets; International Search Report and Written Opinion issued in corresponding International Application No. PCT/FR2008/051826. Date of Mailing: Mar. 31, 2009.

* cited by examiner

*Primary Examiner* — Monica Huson
(74) *Attorney, Agent, or Firm* — Dykema Gossett PLLC

(57) ABSTRACT

This invention proposes a light-weight, thin-walled plastic container, in particular made of polyethylene terephthalate (PET), intended for post-filling pressurization so as to increase the rigidity of said container, and a process for manufacturing such container.

10 Claims, No Drawings

THIN-WALLED PLASTIC CONTAINER FOR PRESSURIZATION

CROSS-REFERENCE TO RELATED APPLICATIONS

This application is a continuation of application Ser. No. 12/681,931, filed Apr. 7, 2010, now U.S. Pat. No. 8,043,552, which claims priority to International Application No. PCT/FR08/51826, filed Oct. 9, 2008, which claims priority to French Application No. 0758185, filed Oct. 10, 2007, the entire contents of which are herein incorporated by reference.

TECHNICAL FIELD

This invention relates to a light-weight, thin-walled plastic container, in particular made of polyethylene terephthalate (PET), intended for post-filling pressurization.

BACKGROUND

This invention relates to a light-weight, thin-walled plastic container, in particular made of polyethylene terephthalate (PET), intended for post-filling pressurization.

In the packaging industry, in particular that of beverages, high-volume, thin-walled plastic containers present certain challenges. Such thin-walled containers are known in, for example, patent applications WO-03/033361, EP-1468930 and EP-1527999. Such containers are very attractive for small volumes (for example, and without limitation, containers of less than about 2 liters), due to the fact that the containers taught by these patents are relatively heavy because the amount of material is linked to the parameter of the volume of these containers.

The increase of the surface area of a package is not proportional to that of the volume of said package. Therefore, for large volume containers (for example, and without limitation, containers of more than about 2 liters), it is entirely possible to reduce the weight of the packages while ensuring good mechanical stability after packaging.

Also, such known containers exhibit the necessity for a pressurization of the inner volume that is not satisfactory as explained below.

In addition, for economic reasons that are easily understood, the object is to reduce the amount of material that is necessary for the production of these thin-walled containers, as much for reducing the production costs as for reducing the recycling costs, which the prior art does not allow since as soon as the volumes become large enough (e.g. greater than 2 liters, in particular), the weight of the material increases very significantly since it is linked to the volume, and is therefore a cubic factor.

These containers are disposable, and it would be advantageous to avoid unnecessary sophistication for the use to which they are put, hence the increased importance of the thin-walled containers but with an identical manufacturing process that allows a range going from small containers of several centiliters up to high volumes of one to several tens of liters by avoiding an excessive increase of the weight of the material.

In addition to the problem of reducing the amount of material, it is possible to mention another problem, that of rigidity, which proportionally decreases with the amount of material.

For these containers that are manufactured by the process according to the prior art with a reduced amount of material, the rigidity of the container that is obtained is inadequate. This rigidity is inadequate for allowing good gripping before opening, and primarily this low rigidity makes difficult, and even impossible, a superposition of these full containers, in particular when they are palletized and the pallets are stacked on one another.

In addition, the rigidity of such a thin-walled container poses another problem because these containers are packaged at ambient temperature and when these containers are placed in a cold environment, a collapsing phenomenon occurs that produces deformations of the container and poor stability during gripping.

In general, such thin-walled containers may be filled under cold conditions with flat liquids such as mineral water, oil, fruit juices, or milk. Then, to meet the requirement of rigidity, it is provided to put these thin-walled containers under internal pressure. For example, such a process may include the so-called "nitrogen drop" process that is currently used industrially, or any other analogous process. This nitrogen drop process consists in introducing a drop of liquid nitrogen into the filled container immediately before the head space of the container is sealed. Immediately after sealing, this drop of liquid nitrogen is transformed into gas. The increase in volume in the head space leads to a rise in pressure in the interior of the container and therefore to a rigidification of said container. This increase in pressure nevertheless remains relatively low (e.g. on the order of one-tenth of a bar).

However, this process of applying nitrogen poses a certain number of problems. Firstly, the metering of the volume that is introduced is difficult, since the final pressure depends on the amount that is introduced, working conditions, and the length of time of sealing. Secondly, the distribution means of this drop of nitrogen should be integrated in the production line, and, as a result, they should therefore be adapted. For example, when the packaging is produced aseptically, this adaptation is a high stress one, requiring cleaning, sterilization, and further maintenance. In production lines, an additional station involves an additional source of potential failure, which can shut down the entire production line. In the case of an aseptic packaging line, this intervention proves still more difficult because the interventions are difficult and time-consuming since it is necessary to restore the unit to aseptic packaging conditions.

In addition, it is noted that liquid nitrogen, at a greatly negative temperature, drops in the liquid to ambient temperature although the fall of the drop uniformly causes splashing on the edges of the container. These splashes of the contained fluid, such as mineral water, fruit juice, and oil, can degrade after packaging and/or during storage, leading to the development of mold before the product is marketed and therefore before the product is consumed, which is not satisfactory.

The material that is used for manufacturing the thin-walled containers is often PET, known for its transparency, low weight, and great shaping possibilities. PET also allows good preservation of contained liquids.

SUMMARY

This invention proposes a light-weight, thin-walled plastic container, in particular made of polyethylene terephthalate (PET), intended for post-filling pressurization so as to increase the rigidity of said container (a process that compensates for the concerns that are mentioned above), and a process for manufacturing such container.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

According to the invention, the process for manufacturing a thin-walled container comprises producing a thin-walled container having a material weight/wall surface ratio on the order of about 150 g/m$^2$ to 250 g/m$^2$, and even about 150 g/m$^2$ to 200 g/m$^2$. The container comprises a neck finish and a body portion. The neck finish weight of the package is excluded from this ratio. The neck finish of the package is defined by the material that does not undergo any deformation during the manufacture of said package. The walls of the body portion undergo deformation during manufacture.

In this case, the thin-walled container is of the type that is manufactured in a known way by a longitudinal and radial blowing process starting from a preformed shape. This container has a necessary and desired volume, and may be manufactured from PET. With PET, residual manufacturing stresses remain, since once the preformed shape is blown, the container is cooled very quickly in the molds. The shape that is obtained and the stresses that are linked to the deformation are created by this lowering of temperature. Actually, during the blowing process, the stresses are exerted in two directions, longitudinal and radial, hence the name of bi-oriented PET container given to the containers that are thus obtained. This setting at a temperature that is below the glass transition temperature is what ensures that the container retains its shape.

The process for pressurization, according to this invention, of a thin-walled container that is obtained according to the preceding process, designed to contain a liquid, may comprise the following stages:

Production of a container according to the preceding process;

Filling the thin-walled container, which has residual stresses with said liquid;

Sealing the container after filling; and,

Heating the wall of the container, without raising the temperature of the liquid, to reach the temperature point for release of said residual stresses so as to generate a reduction of volume of the container and therefore a pressurization of said container.

The liquid may be a flat liquid (non-carbonated) and may also be filled under ambient or cold temperature conditions. The purpose of the last so-called heating stage of the container wall is to heat only the wall taken in its thickness. This heat input causes the release of stresses that had been created by the rapid cooling after deformation during manufacturing. In the case of a blown PET container, the residual stresses are bi-oriented. The container therefore has a tendency to resume its initial shape, i.e., that of the preformed shape.

Because of this tendency toward a volumetric reduction, the interior of the container is pressurized and since the liquid is incompressible, the head space is compressed until a balance is reached between the pressure exerted by the wall and the inner pressure. The thus generated inner pressure generally remains less than 1 bar, but this pressure is positive and is absolutely adequate for considerably increasing the rigidity of the filled and sealed container before its first sealing.

By way of example and without limitation, such heating can be implemented by means of spraying hot air on the periphery of the container for a short period of time. It is advisable to reach the temperature point that causes the release of the stresses in the material, a point also known under the name of glass transition point.

The heat energy input should be significant over a very short period. Thus, the PET, which is a poor conductor of heat, absorbs calories supplied by hot air, which leads to a rapid release of the stresses and prevents the transmission of calories to the liquid or at least makes the amount of transmitted calories totally negligible.

Actually, in the case of heating and a temperature rise of the liquid mass that is contained, it is known that this causes, in cooling, a reduction of the volume of the head space that is reflected by a collapse of the bottle. Actually, the inner pressure decreases while the container has seen its volume created, since the release of the stresses is also created with the lowering of the temperature below the glass transition point.

The inner pressurization according to the process of this invention also makes it possible to compensate for the reduction in pressure, minimal as it may be, linked to the loss of a portion of the liquid due to container wall permeability, the container walls being very thin.

The pressurization of the interior of the container also makes it possible to compensate for the collapse that is linked to a temperature decrease between the packaging temperature and the storage temperature, prior to opening.

The thus used process is extremely useful and commercially adaptable with very limited costs, very small breakdown risks, and an absolutely satisfactory reproducibility since it is self-regulated.

Primarily, the rigidification processing by heat may be conducted outside of the filling line, namely when the container is sealed with a closure, which is a considerable gain by eliminating an operation inside the aseptic chamber when the packaging is produced by aseptic means.

The thin-walled containers that are thus produced, having wall thicknesses such that the material weight/surface ratio is between about 150 g/m$^2$ and 250 g/m$^2$, and more particularly about 150 g/m$^2$ and 200 g/m$^2$, can withstand large loads because of their greatly increased rigidity; in particular, such containers can be palletized, and the pallets themselves can be stacked.

From the sanitary standpoint, it should also be noted that the guarantee of the preservation of qualities imparted to the liquid during bottling cannot be disputed since the heating operation is outside of the bottling chain and is implemented on a closed container. The advantage of this outside operation is measured when it is a matter of a production line working in an aseptic environment. Also, a possible contamination source is eliminated since the station that allows the pressurization of the interior of the container is withdrawn from the working zone that would otherwise be within an aseptic environment.

The heating—of which it is indicated that a preferred embodiment is that of hot air—can also resort to any other type of heating that allows a rapid elevation of the temperature of the wall without significantly influencing the temperature of the contents, for example infra-red heating.

Likewise, the material in question is PET because it is currently the most used, but this invention relates to any suitable material for producing a container, able to exhibit residual stresses, obtained from deformation.

What is claimed is:

1. A filled and sealed thin-walled plastic container, wherein the container comprises:

a closure sealing the container;

a neck finish; and, a body portion having a material weight to wall surface ratio on the order of 150 g/m$^2$ to 250 g/m$^2$;

wherein the container contains a liquid and has a positive internal pressure that initially reconfigures the plastic material of the body portion, and the body portion having a structure further configured from being externally heated, after filling and sealing the container, to a temperature to release residual stresses associated with the cooling of the liquid; and wherein, with the release of residual stresses associated with the liquid, the body portion is heated without raising the temperature of the liquid.

2. A filled and sealed thin-walled plastic container according to claim 1, wherein the container comprises polyethylene terephthalate (PET).

3. A filled and sealed thin-walled plastic container according to claim 1, wherein the container is bi-oriented.

4. A filled and sealed thin-walled plastic container according to claim 1, wherein the liquid is non-carbonated.

5. A filled and sealed thin-walled plastic container according to claim 1, wherein the container generally has an internal pressure of 1 bar or less.

6. A filled a sealed thin-walled plastic container according to claim 1, wherein the container body portion has a material weight to wall surface ratio on the order of 150 g/m2 to 200 g/m2.

7. A filled and sealed thin-walled plastic container, wherein the container comprises:

a closure sealing the container;
a neck finish; and,
a body portion having a material weight to wall surface ratio on the order of 150 g/m2 to 250 g/m2;
wherein the container is bi-oriented, comprises polyethylene terephthalate (PET), contains non-carbonated liquid, has a positive internal pressure of 1 bar or less, and the body portion having a structure configured from being externally heated, after filling and sealing the container, to a temperature to release residual stresses associated with the cooling of the liquid.

8. A filled and sealed thin-walled plastic container according to claim 7, wherein, with the release of residual stresses associated with the liquid, the body portion is heated without raising the temperature of the liquid.

9. A filled and sealed thin-walled plastic container according to claim 1, wherein, the release of residual stresses provides a reduction in internal volume of the container.

10. A filled and sealed thin-walled plastic container according to claim 7, wherein the filling and sealing of the container, prior to the body portion being heated to a temperature to release residual stresses associated with the cooling of the liquid, reconfigures the plastic material of the container and generates an internal pressure.

* * * * *

UNITED STATES PATENT AND TRADEMARK OFFICE
CERTIFICATE OF CORRECTION

PATENT NO. : 9,011,756 B2
APPLICATION NO. : 13/184062
DATED : April 21, 2015
INVENTOR(S) : Jean-Tristan Outreman Page 1 of 1

It is certified that error appears in the above-identified patent and that said Letters Patent is hereby corrected as shown below:

In the Claims

COLUMN 5, line 21 (Claim 6, line 1), the second "a" should be -- and --.

Signed and Sealed this
Eighteenth Day of August, 2015

Michelle K. Lee
*Director of the United States Patent and Trademark Office*